(12) United States Patent
Ap et al.

(10) Patent No.: US 12,483,994 B2
(45) Date of Patent: Nov. 25, 2025

(54) ANTENNA HOPPING FOR SPECIFIC ABSORPTION RATE (SAR) REDUCTION

(71) Applicant: Altera Corporation, San Jose, CA (US)

(72) Inventors: Santhosh Ap, Bangalore (IN); Madhukiran Sreenivasareddy, Bangalore (IN); Vamshi Krishna Aagiru, Bangalore (IN); Nithesha Ananda, Surathkal (IN)

(73) Assignee: Altera Corporation, San Jose, CA (US)

( * ) Notice: Subject to any disclaimer, the term of this patent is extended or adjusted under 35 U.S.C. 154(b) by 389 days.

(21) Appl. No.: 17/868,800

(22) Filed: Jul. 20, 2022

(65) Prior Publication Data

US 2023/0098822 A1 Mar. 30, 2023

(30) Foreign Application Priority Data

Sep. 24, 2021 (EP) .................................. 21198872

(51) Int. Cl.
*H04W 52/22* (2009.01)
*H04B 1/3827* (2015.01)

(52) U.S. Cl.
CPC ........ *H04W 52/226* (2013.01); *H04B 1/3838* (2013.01)

(58) Field of Classification Search
CPC . H04W 52/226; H04B 1/3838; H04B 7/0691; H04B 7/0602
USPC ......................................................... 455/522
See application file for complete search history.

(56) References Cited

U.S. PATENT DOCUMENTS

| 10,291,310 | B1 | 5/2019 | Gopal et al. | |
|---|---|---|---|---|
| 2014/0269964 | A1* | 9/2014 | Du | H04L 1/1685 |
| | | | | 375/267 |
| 2018/0048054 | A1 | 2/2018 | Song | |
| 2018/0175944 | A1* | 6/2018 | Seyed | H04B 1/3833 |
| 2020/0076241 | A1* | 3/2020 | Tandai | H02J 50/80 |
| 2021/0226752 | A1 | 7/2021 | Choi et al. | |

OTHER PUBLICATIONS

Parital European Search Report issued for the corresponding European Application No. 21198872.0, dated Mar. 31, 2022, 16 pages (for informational purposes only).
European Search Report issued for the corresponding European Application No. 21198872.0, dated Sep. 6, 2022, 17 pages (for informational purposes only).

* cited by examiner

*Primary Examiner* — Eugene Yun
(74) *Attorney, Agent, or Firm* — Viering, Jentschura & Partner mbB (57) ABSTRACT

A method comprising: retrieving a predefined power threshold; determining a transmission power of a transmitting antenna, wherein the transmitting antenna is actively transmitting a signal; retrieving a predefined transmission time interval; determining that the transmission power exceeds the predefined power threshold; determining a duration of transmitting the signal; comparing the duration with the predefined transmission time interval; and switching transmitting the signal from the transmitting antenna to a further antenna when the duration equals the predefined transmission time interval.

11 Claims, 12 Drawing Sheets

| PARAMETER | MIN. | TYP. | MAX. | UNITS |
|---|---|---|---|---|
| V$_{DD}$ Supply Voltage | 1.55 | 1.8 | 1.95 | V |
| V$_{DD}$ Supply Current | | 57 | 80 | µA |
| C$_{TL1}$ Logic Low Voltage | 0.00 | 0.00 | 0.45 | V |
| C$_{TL1}$ Logic High Voltage | 1.3 | 1.8 | 2.5 | V |
| C$_{TL1}$ Logic High Current | | 0.1 | 5 | µA |
| Turn-On Time | | | 20 | µs |
| Switching Speed (Ctl High to RF90%) | | 2.5 | 3 | µs |

| Antenna | Frequency Band | Power Threshold (dBm) | | Hopping Interval (seconds) |
|---|---|---|---|---|
| | | Upper | Lower | |
| Main | B1 | 21 | 18 | 10s |
| | N77 | 23 | 20 | 10s |
| Diversity | B1 | 21 | 18 | 10s |
| | N77 | 23 | 20 | 10s |
| MIMO-1 | B1 | 21 | 18 | 10s |
| | N77 | 23 | 20 | 10s |
| MIMO-2 | B1 | 21 | 18 | 10s |
| | N77 | 23 | 20 | 10s |

FIG. 12

ANTENNA HOPPING FOR SPECIFIC ABSORPTION RATE (SAR) REDUCTION

RELATED APPLICATIONS

The present application claims priority to European Patent Application number 21198872.0, filed on Sep. 24, 2021, the contents of which are herein incorporated by reference in its entirety.

TECHNICAL FIELD

This disclosure may generally relate to the field of wireless communications.

BACKGROUND

In wireless communication devices, meeting regulatory requirements is mandatory. For example, end user computing devices with radios are required to operate within a regulatory range of SAR (Specific Absorption Rate). When a mobile communication device detects it is within human proximity, it must ensure it is operating within a compliant SAR range. SAR sensors are used for the detection of human proximity. Once the human proximity is detected, the devices may need to back-off the transmission (TX) power to meet regulatory requirements. The reduction in TX power impacts the performance and the link reliability of the wireless communication device. Additionally, the SAR sensors are expensive, consume area, and increase the design complexity of a wireless communication device. This disclosure proposes a technique to meet the regulatory requirements without reducing TX power and without the use of SAR sensors.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various aspects of the disclosure are described with reference to the following drawings, in which.

DETAILED DESCRIPTION

Wireless communication devices may meet TX power regulation requirements by detecting human proximity using SAR sensors and sensing elements to determine when to reduce TX power. The device may reduce TX power to within a pre-defined SAR range defined by regulations in response to detecting human proximity. Additionally, wireless communication devices may use time averaging SAR to meet TX power regulations. Because SAR sensors are expensive, consume area, and increase the system design complexity, it may be desirable to meet SAR regulations without SAR sensors. In the time averaging SAR method, the overall TX power is reduced by a certain amount, irrespective of the proximity detection, based on the pre-defined duty cycle. This also may affect system performance and link reliability in the poor coverage areas. Reducing TX power, or power back-off, affects the system performance and link reliability in the poor coverage areas. It would be desirable to reduce the effects of TX power reduction.

This disclosure proposes a technique to meet the regulatory SAR requirements without the use of SAR sensors and power back-off. The present-day wireless communication devices, such as fifth generation (5G) modems, may include multiple antenna configurations. Additionally, modern wireless communication devices may include a TRX (Transmit-Receive) switching mechanism to meet 3rd Generation Partnership Project (3GPP) standards. For example, the sounding reference signal (SRS) antenna switching mechanism as described in technical specification (TS) 38.214 6.2.1.2.

The SRS is a reference signal transmitted by a user equipment (UE) in the uplink direction which is used by an eNodeB to estimate the uplink channel quality over a wider bandwidth. The eNodeB may use this information for uplink frequency selective scheduling. The eNodeB can also use SRS for uplink timing estimation as part of timing alignment procedure, particularly in situations like where there are no Physical Uplink Shared Channel/Physical Uplink Control Channel (PUSCH/PUCCH) transmissions. If there are no PUSCH/PUCCH transmissions for an extended period of time, the eNodeB may rely on SRS for uplink timing estimation. SRS doesn't need to be transmitted in the same physical resource blocks where PUSCH/PUCCH is transmitted as SRS signals may stretch over a larger frequency range.

There are 3 types of SRS transmissions defined in the 3GPP TS for long term evolution (LTE). From release-8 of the 3GPP TS onwards 'Single SRS' transmission and 'Periodic SRS' transmissions are supported. In release-10 of the 3GPP TS, 'Aperiodic SRS' transmissions are introduced.

A UE may use SRS antenna switching to meet the 3GPP standard and enhance the user experience. This disclosure makes use of the multiple antenna configurations along with the antenna switching mechanisms to hop the transmit signal at regular intervals thereby reducing the hot spot build-up, a temperature increase in human body at a particular location due to continuous exposure to radiation.

The Sounding Reference Signal (SRS) is a reference signal transmitted by the UE in the uplink direction which is used by the eNodeB to estimate the uplink channel quality over a wider bandwidth. The eNodeB may use this information for uplink frequency selective scheduling.

The eNodeB can also use SRS for uplink timing estimation as part of timing alignment procedure, particularly in situations like there are no PUSCH/PUCCH transmissions occurring in the uplink for a long time in which case, the eNodeB relies on SRS for uplink timing estimation.

SRS doesn't need to be transmitted in the same physical resource blocks where PUSCH is transmitted as SRS may stretch over a larger frequency range.

There are 3 types of SRS transmissions defined in LTE. From release-8 onwards 'Single SRS' transmission and 'Periodic SRS' transmissions are supported. In release-10, 'Aperiodic SRS' transmission is introduced.

This disclosure has the benefits of reducing costs and saving area due to elimination of SAR sensors. Additionally, Radio Frequency (RF) performance improves as power back-off is not required and provides improved link reliability at poor coverage areas. Without SAR sensors, a UE may avoid unnecessary power back-off due to false triggering of human proximity. This disclosure may be combined with the TA-SAR (Time Averaging SAR) technique, where the transmit power thresholds will be enhanced by antenna switching, thereby improving overall performance and link reliability. The power threshold may trigger an antenna switch when a power threshold is met.

Figure 1:
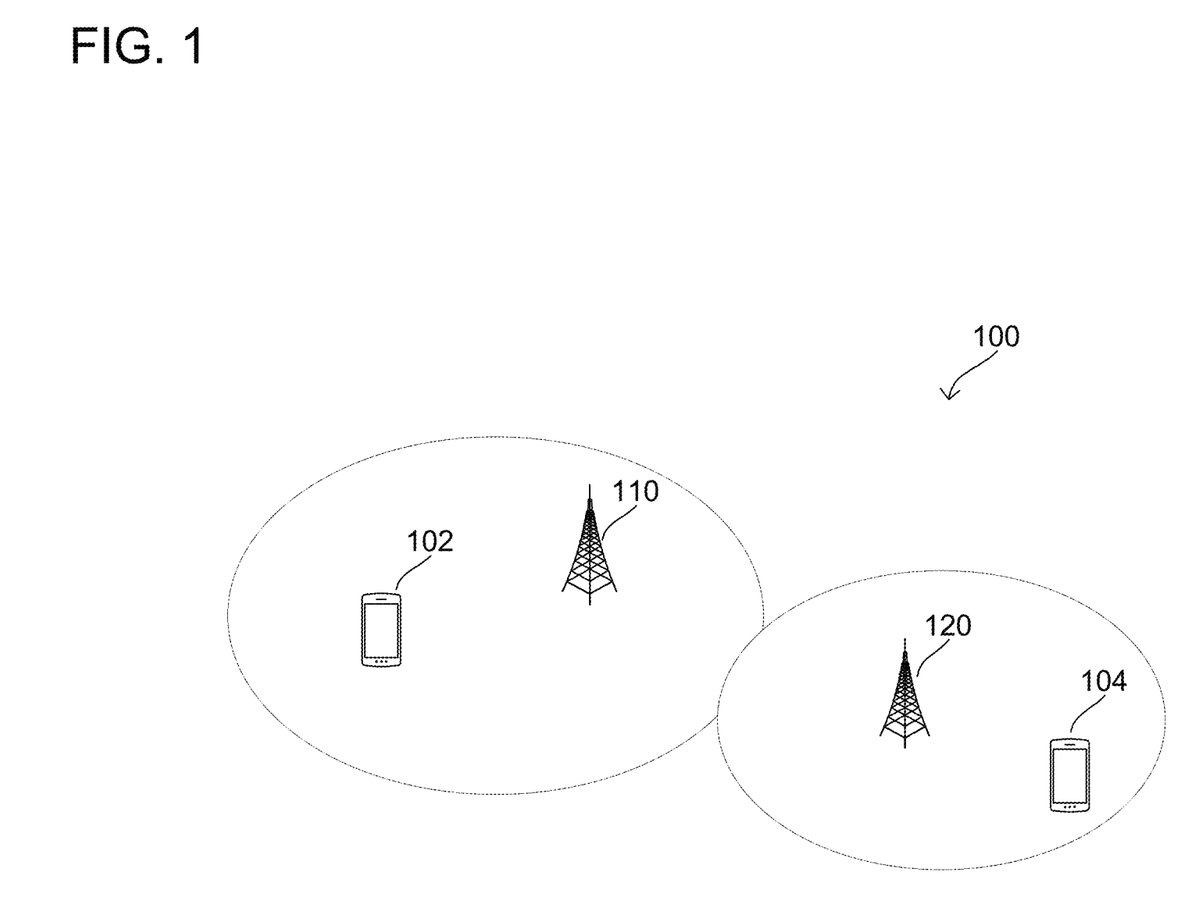
FIG. 1 shows an exemplary radio communication network.

FIG. 1 shows exemplary radio communication network 100, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

Figure 2:
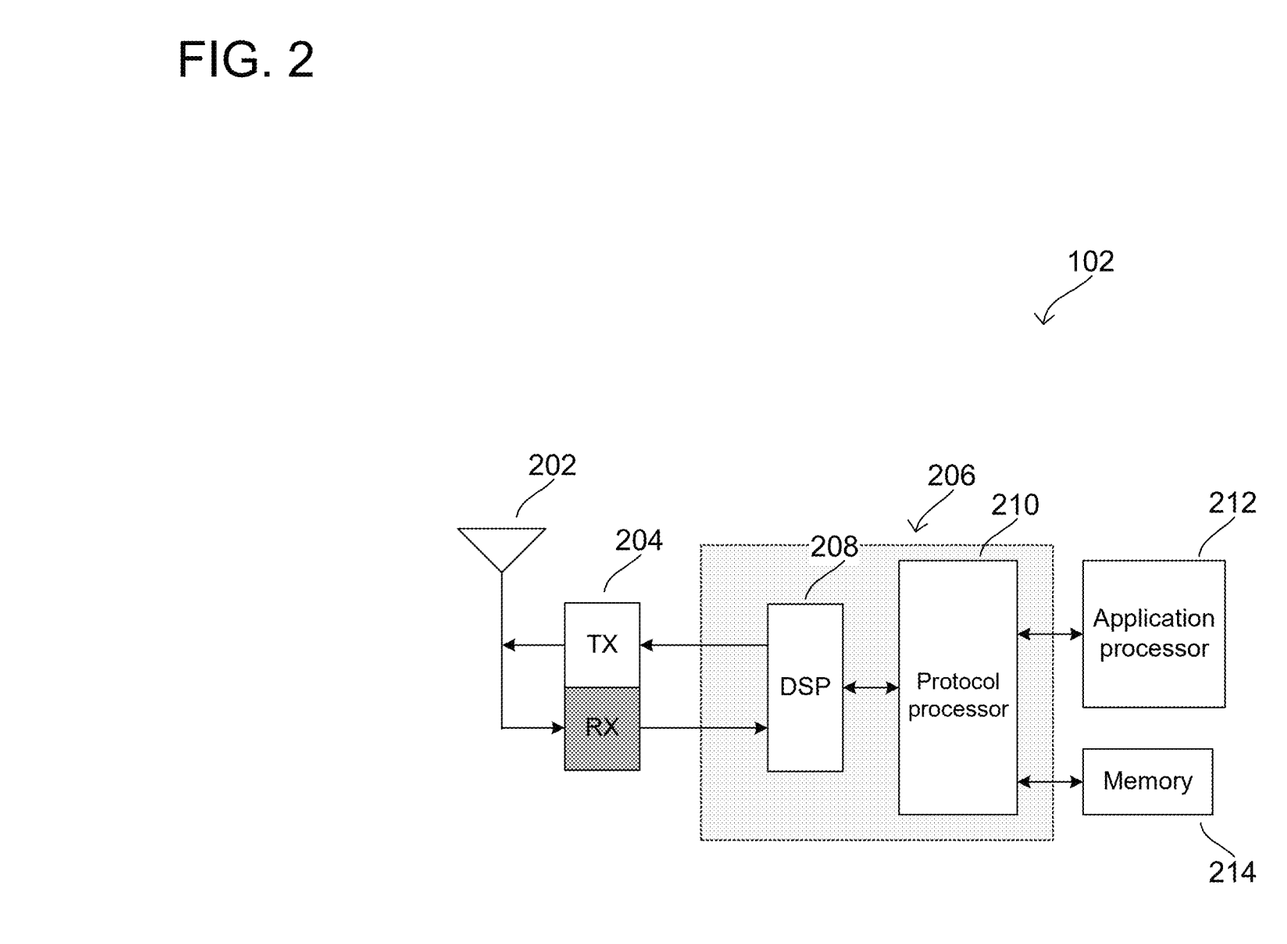
FIG. 2 shows an exemplary internal configuration of a terminal device.

FIG. 2 shows an exemplary internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMIs), user input/output devices (display(s), keypad (s), touchscreen(s), speaker(s), external button(s), camera (s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs)), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
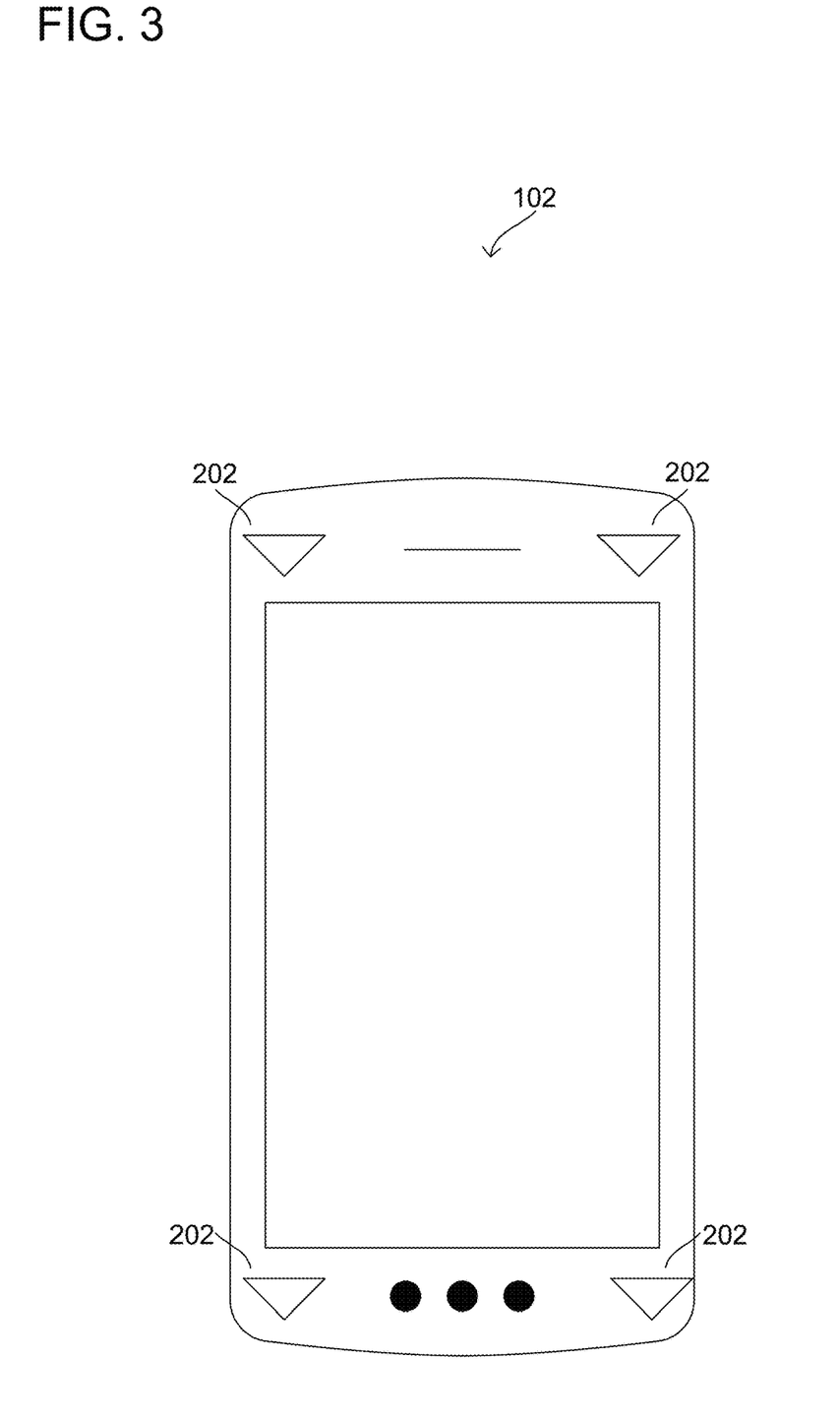
FIG. 3 shows an exemplary terminal device.

FIG. 3 shows an exemplary terminal device 102 with four antenna systems 202. The antennas 202 may be strategically placed to maximize the distance between each pair of antennas 202. Switching the transmit chain between the four antenna systems 202 may alleviate hotspot buildups caused by maintaining the transmit chain at one antenna 202 for an extended period of time. In the system design of a terminal device, such as device 102, the antennas 202 may be spaced apart to get a better correlation and isolation.

In cellular modems, the transmission takes places through a dedicated antenna and thereby continuously exposes the same portion of a human body to the radiation for a longer time. Due to this there will be a rise in temperature of the exposed body area. To avoid any damage, the SAR limit is defined by regulation for all radio devices. To meet this regulatory requirement, the device manufacturers may employ a proximity sensor to detect the human presence. Upon the detection of human presence, the transmit power is reduced if it is above the pre-defined threshold. This reduction in transmit power affects the system performance of a UE and the link reliability.

SAR stands for Specific Absorption Rate, which is the unit of measurement for the amount of Radio Frequency (RF) energy absorbed by the body. For example, using a mobile phone/Tablet/Laptop or being in close proximity of radio frequency transmitting antennas.

Without using SAR sensors, SAR may be reduced by hopping between antennas of a terminal device. The typical power back off values for a laptop/tablet may vary from 1 to 5 dB. Using the antenna hopping technique described below, eliminates the requirement to have a power back-off as the antenna hopping will reduce SAR by up to 6 dB, if four antennas are used for antenna hopping, by switching between antennas of a device.

Figure 4:
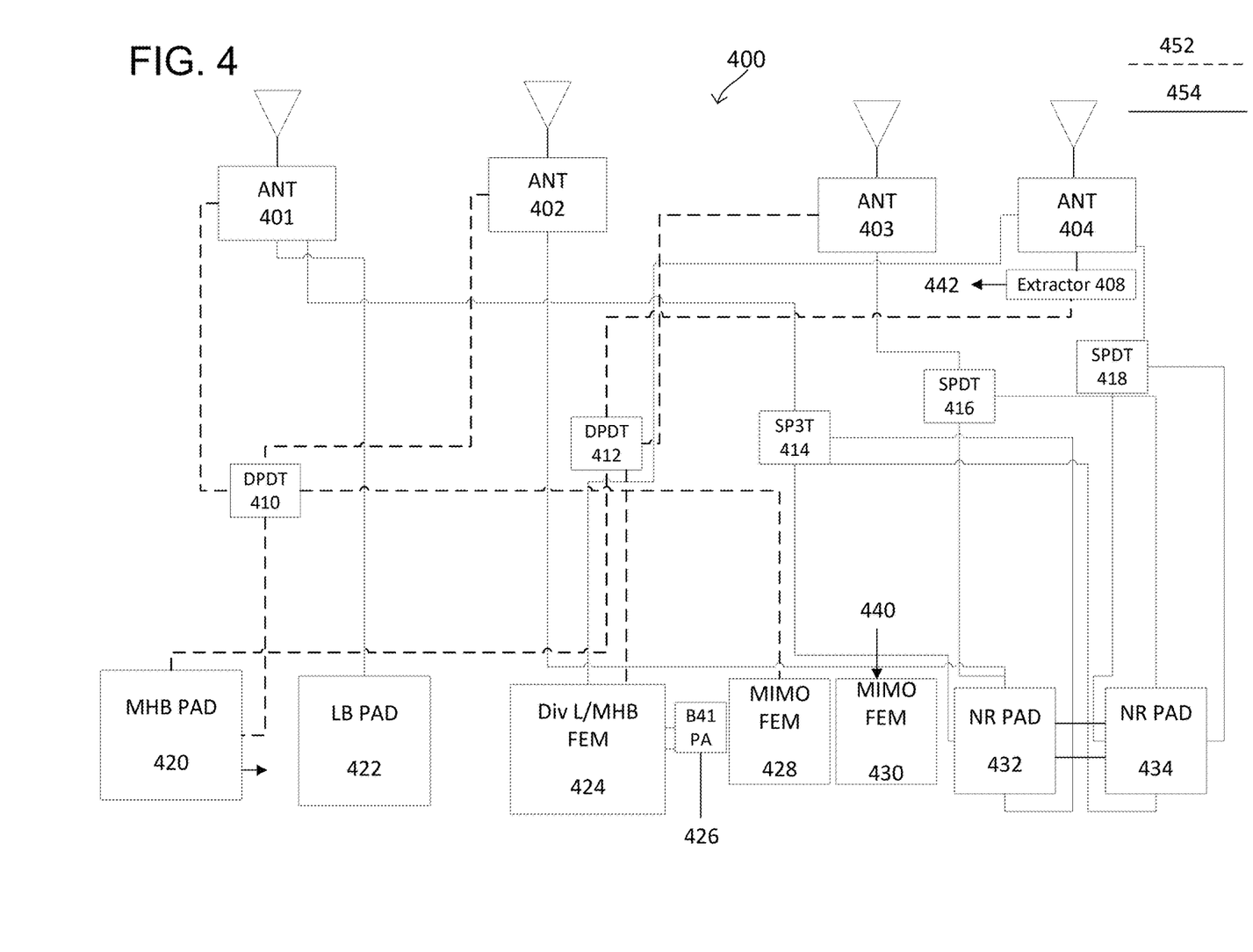
FIG. 4 illustrates an exemplary of a radio frequency front end of a 5G modem.

FIG. 4 shows a 5G modem 400 front-end architecture containing multiple antennas. Modem 400 may be the same as modem 206 described in FIG. 2. The configuration of 5G modem 400 may include different switches to support BAS (Best Antenna Selection). For example, modem 400 may include two double pole, double throw (DPDT) switches 410 and 412, two single pole, double throw (SPDT) switches 416 and 418, and one single pole, three throw (SP3T) switch 414. Switches 410-418 may be controlled to switch the transmission chain between antennas 401-404. The transmit receive chains, illustrated by dashed line 452, may be designated as a transmit only chain. A switching mechanism may switch the transmission chain between one of the four antennas 401-404. 5G modem 400 may include other mid-high diversity components which are electronically coupled, as illustrated by solid line 454. For example, mid-high band (MHB) power amplifier duplexer (PAD) 410, low band (LB) PAD 422, Divergence L (Div L)/MHB front-end module (FEM) 424, B41 power amplifier (PA) 426, Multiple-In, Multiple-Out (MIMO) FEMs 428 and 430, and New Radio (NR) PADs 432 and 434. It should be noted that not all components may be required for MHB diversity and that other components, not shown, may be included. Other configurations of a modem front end may also allow for antennas switching as described in this disclosure. The present disclosure makes of invention modem front end architectures to switch the antenna without adding any additional cost or without degrading existing performance.

The present disclosure proposes to use multi antenna configurations along with switching mechanisms to hop, or switch, the transmit signal among the available antennas at regular time intervals when the transmit power exceeds the pre-defined threshold. To avoid continuous exposure of a particular area of a user body to the radiation, the modem FE may be configured to switch the transmitting antenna at designated intervals. This reduces the hot-spot build-up on an area of a user body. This eliminates the necessity to back-off the transmit power to meet the SAR regulatory requirements. This will in-turn improve the system performance and link reliability.

Transmission can take place through each of the four antennas 401-404 by using the switches 410-418. The main TRX path is highlighted by a dotted line 456 and the RX paths (MIMO) are highlighted by dashed line 452 in FIGS. 5-8. For this example, the Mid and High bands (MHB) are considered.

Figure 5:
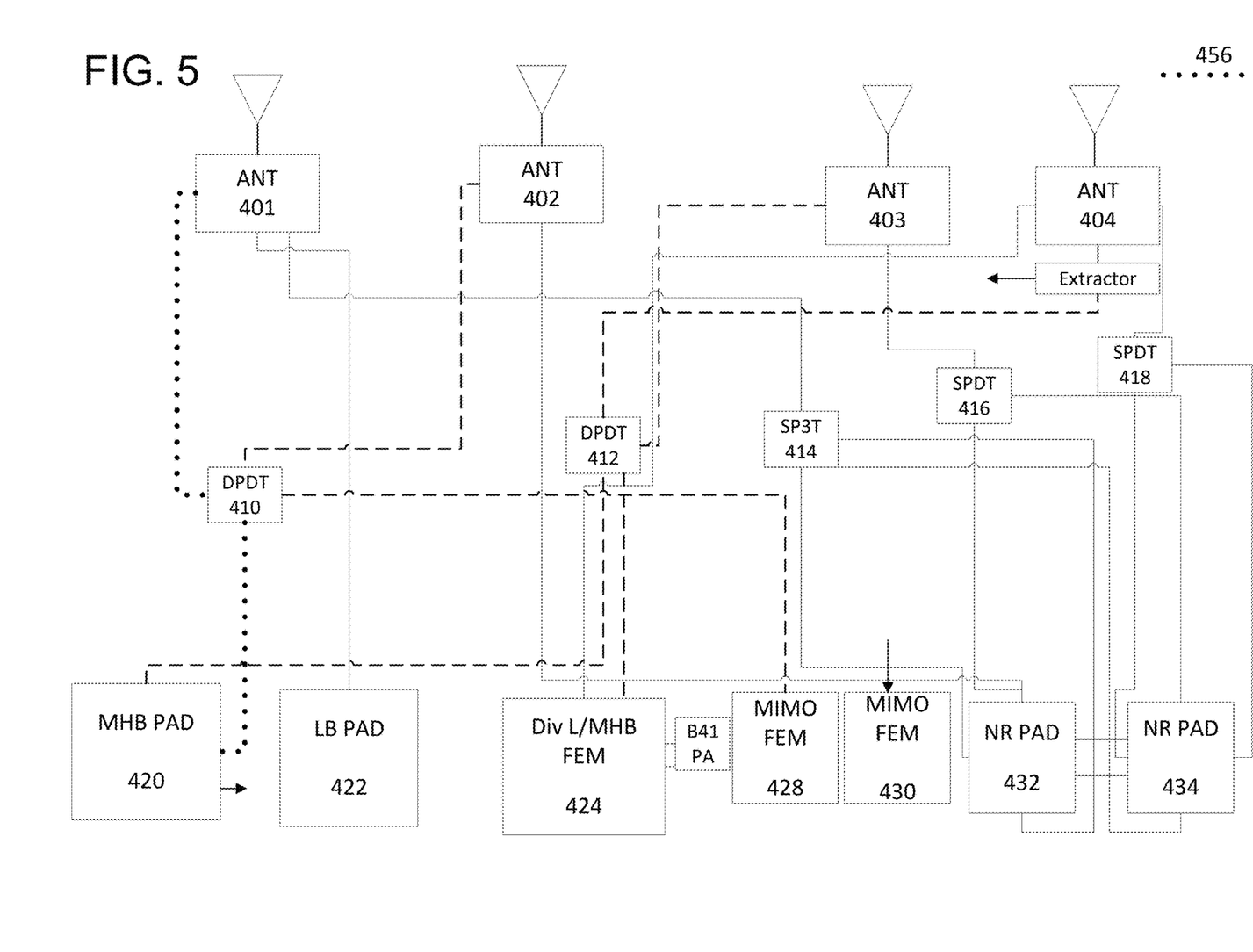
FIGS. 5-8 illustrate exemplary switching TX between one of 4 antennas in a wireless communication device.

FIG. 5 shows modem FE 400 at a first point in time where the transmit chain, illustrated by dotted line 456, is transmitting through antenna 401. All other TRX chains are used for reception (RX) only, using antennas 402, 403, and 404.

Figure 6:
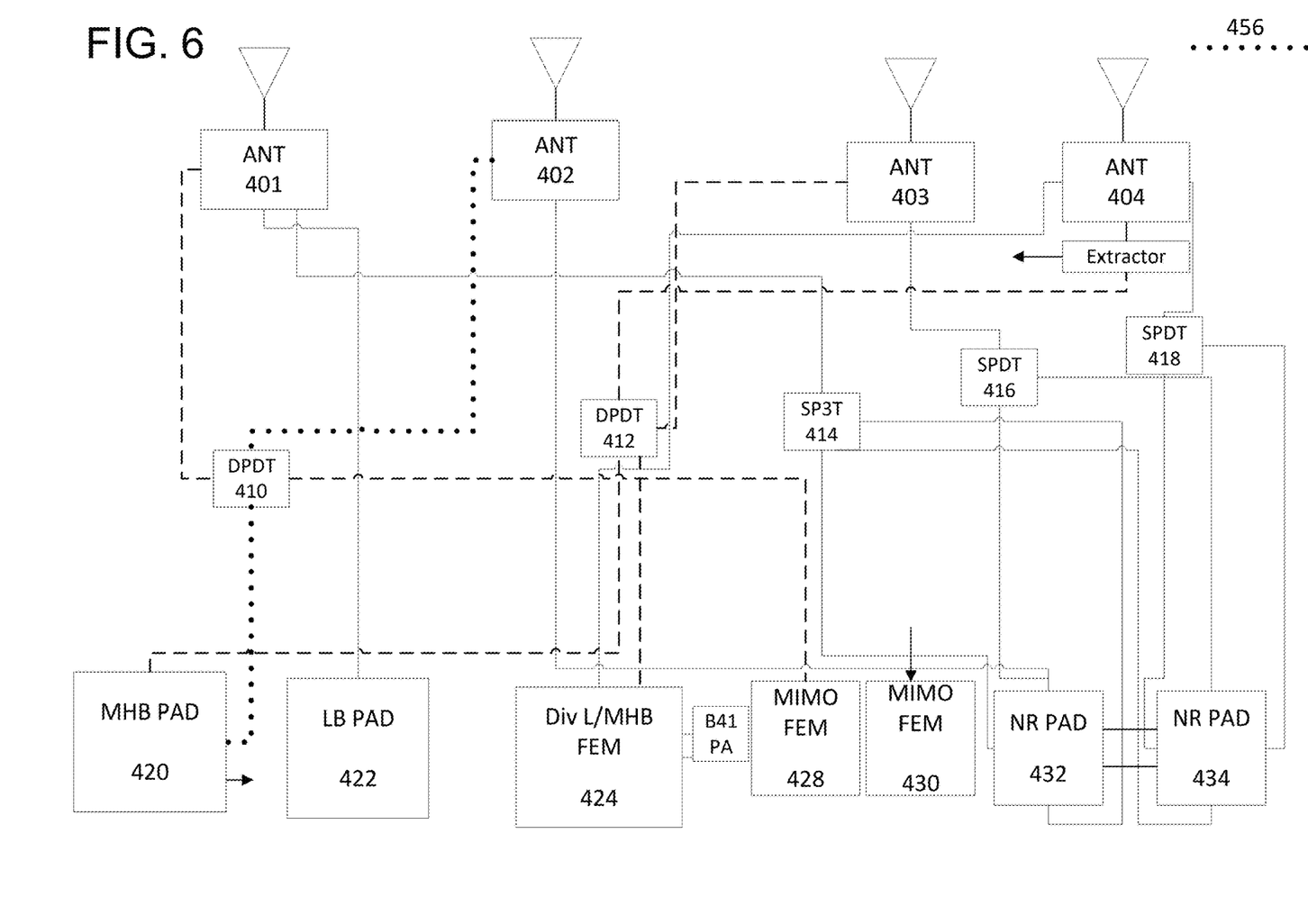

FIG. 6 shows modem FE 400 at a second point in time where the transmit chain, illustrated by dotted line 456, is changed from antenna 401 to antenna 402 using switches 410-418. All other TRX chains are used for RX only, using antennas 401, 403, and 404.

Figure 7:
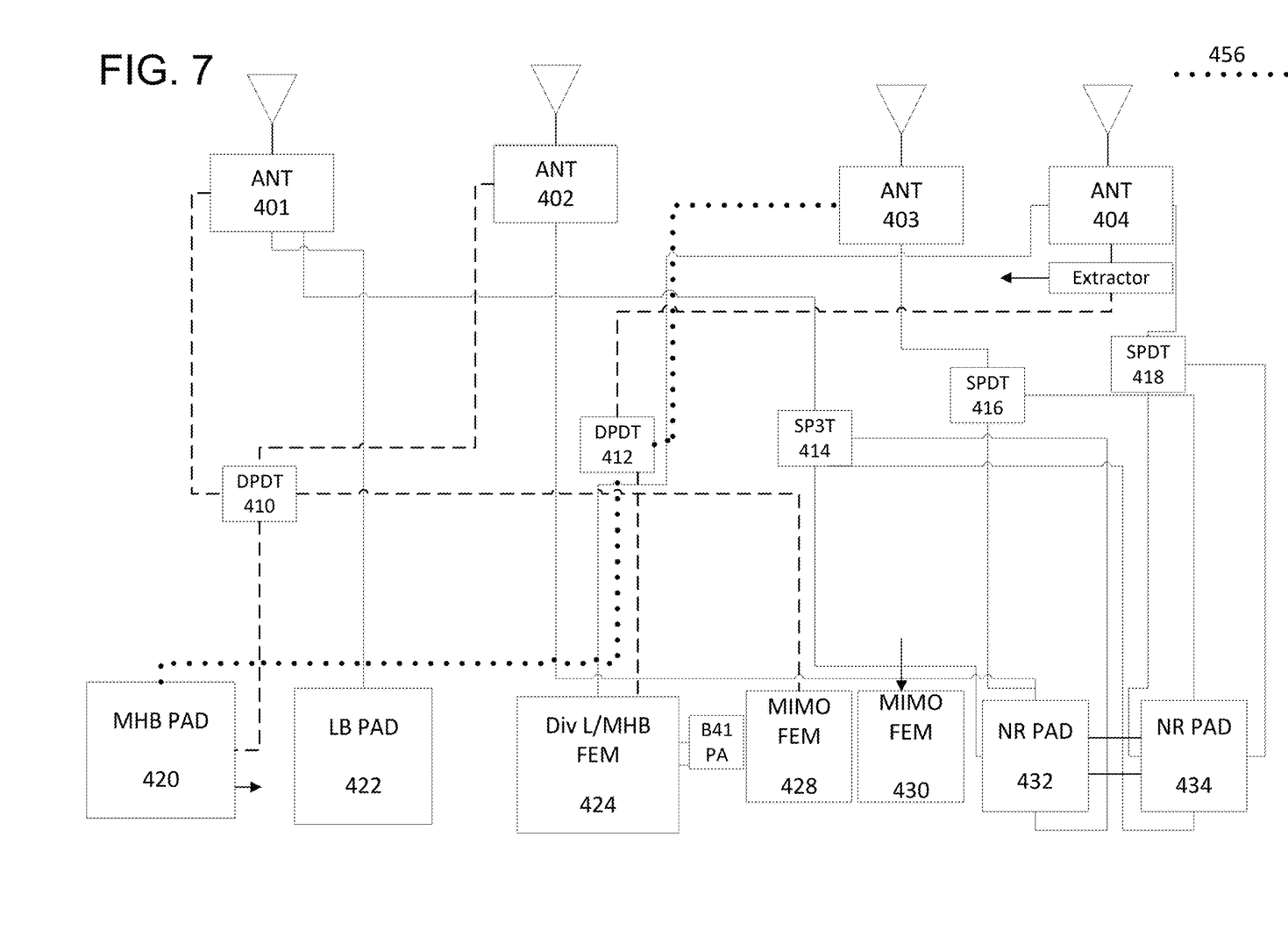

FIG. 7 shows modem FE 400 at a third point in time where the transmit chain, illustrated by dotted line 456, is changed from antenna 402 to antenna 403 using switches 410-418. All other TRX chains are used for RX only, using antennas 401, 402, and 404.

Figure 8:
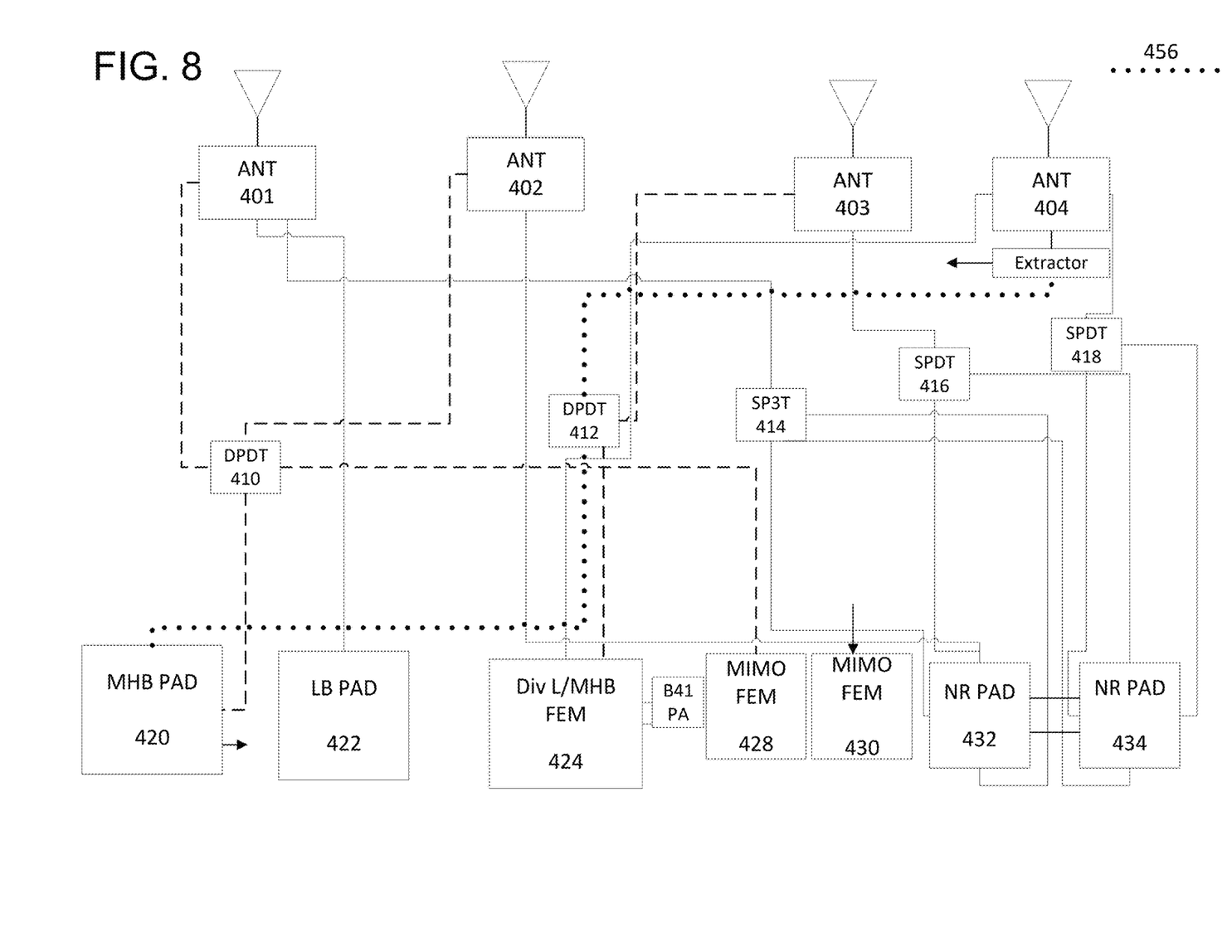

FIG. 8 shows modem FE 400 at a fourth point in time where the transmit chain, illustrated by dotted line 456, is changed from antenna 403 to antenna 404 using switches 410-418. All other TRX chains are used for RX only, using antennas 401, 402, and 403.

The transmission chain path may be calibrated during antenna switching. During the calibration process, the entire four antennas paths are calibrated to ensure use of the correct power output at the antenna ports during normal operation and SRS. Calibrating the TX path may make use of the same calibration table used for traditional UE operation. Therefore, no additional effort or time is required for calibration during the design of a UE device.

It should be noted that these changes are illustrative only. The transmit chain can be changed between any two antennas. For example, changing the transmit chain from antenna 403 to antenna 401. The subsequent antenna may be chosen at random, because of distance to the current antenna, or any other number of determinations. Alternatively, a best antenna selection algorithm may be used to determine the best subsequent antenna. The algorithm may make the determination based on distance between antennas or any other number of factors.

The modem FE 400 may include switches to support BAS, SRS and MIMO requirements. Making use of these switches to select different antenna for transmission does not require additional components. Therefore, there will be no additional insertion loss to the front end and no degradation in the performance.

When switching the transmit chain between the antenna, the MIMO operation will continue to function as normal without degrading the receiver through-put performance.

By switching the transmit chain between antennas, a terminal device may overcome triggering power back-off due to false detection of human presence. In human detection techniques using SAR sensors, metallic objects may trigger the SAR sensor and result in a false detection of human presence. This will cause unnecessary power back-off, thereby degrading performance and link reliability. As the technique proposed in this invention does not employ SAR sensors, false triggers may be avoided.

Figure 9:
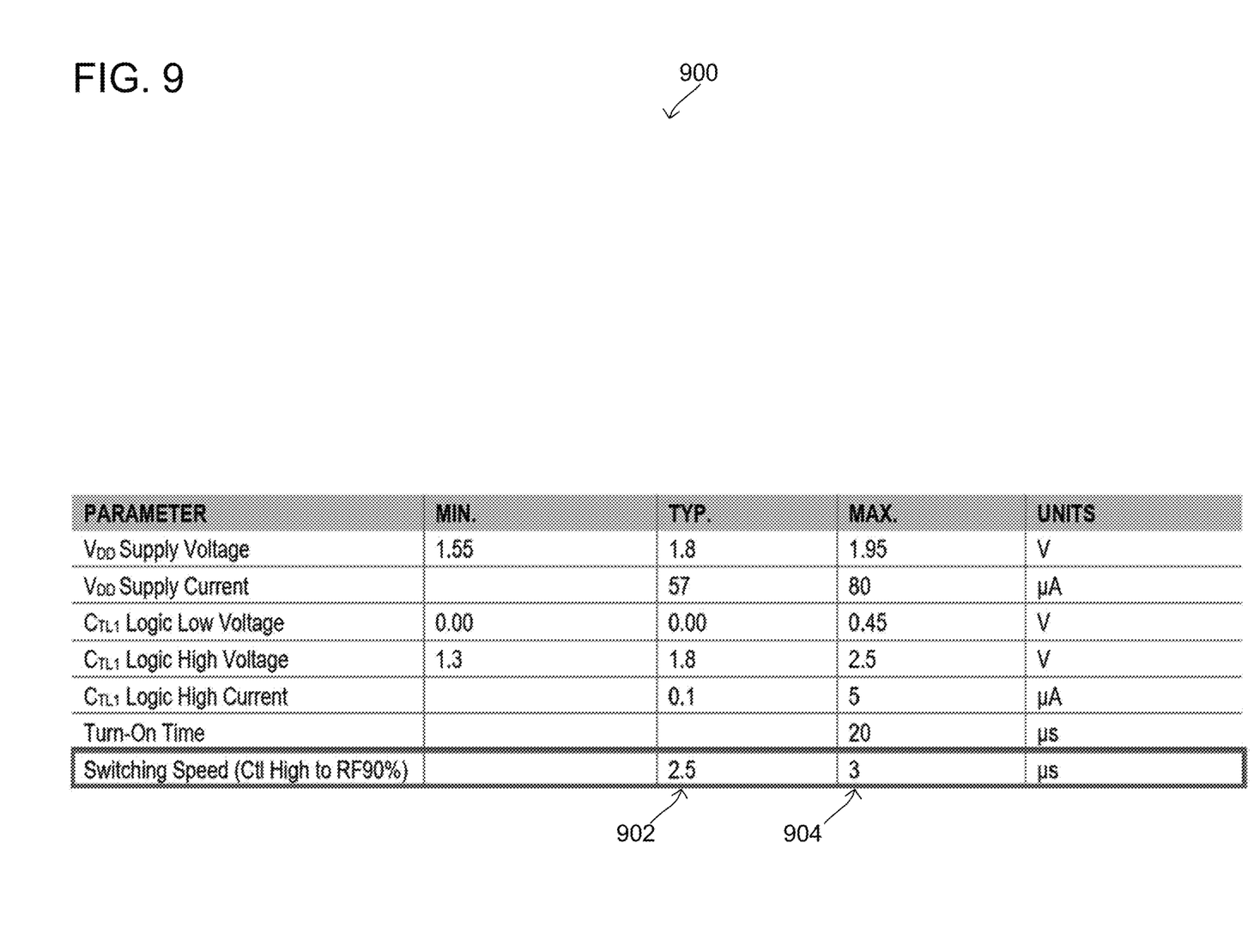
FIG. 9 illustrates switching times when switching between multiple antennas in a wireless communication device.

FIG. 9 illustrates an exemplary chart 900 showing the switching times of switches in a 5G modem. For example, the switching time of the SPDT/DPDT switches is low enough to not cause any degradation in performance. As shown in chart 900, the typical switching time is 2.5 µs 902 with a maximum switching time of 3 µs 904. Using a 5G modem FE with switches with similar switching times will avoid degradation.

Antenna switching may be combined with a Time Averaging SAR (TA-SAR) technique to improve the user experience. When this Antenna hopping technique is combined with TA-SAR, it will further enhance the average SAR upper threshold and improve the overall performance.

Figure 10:
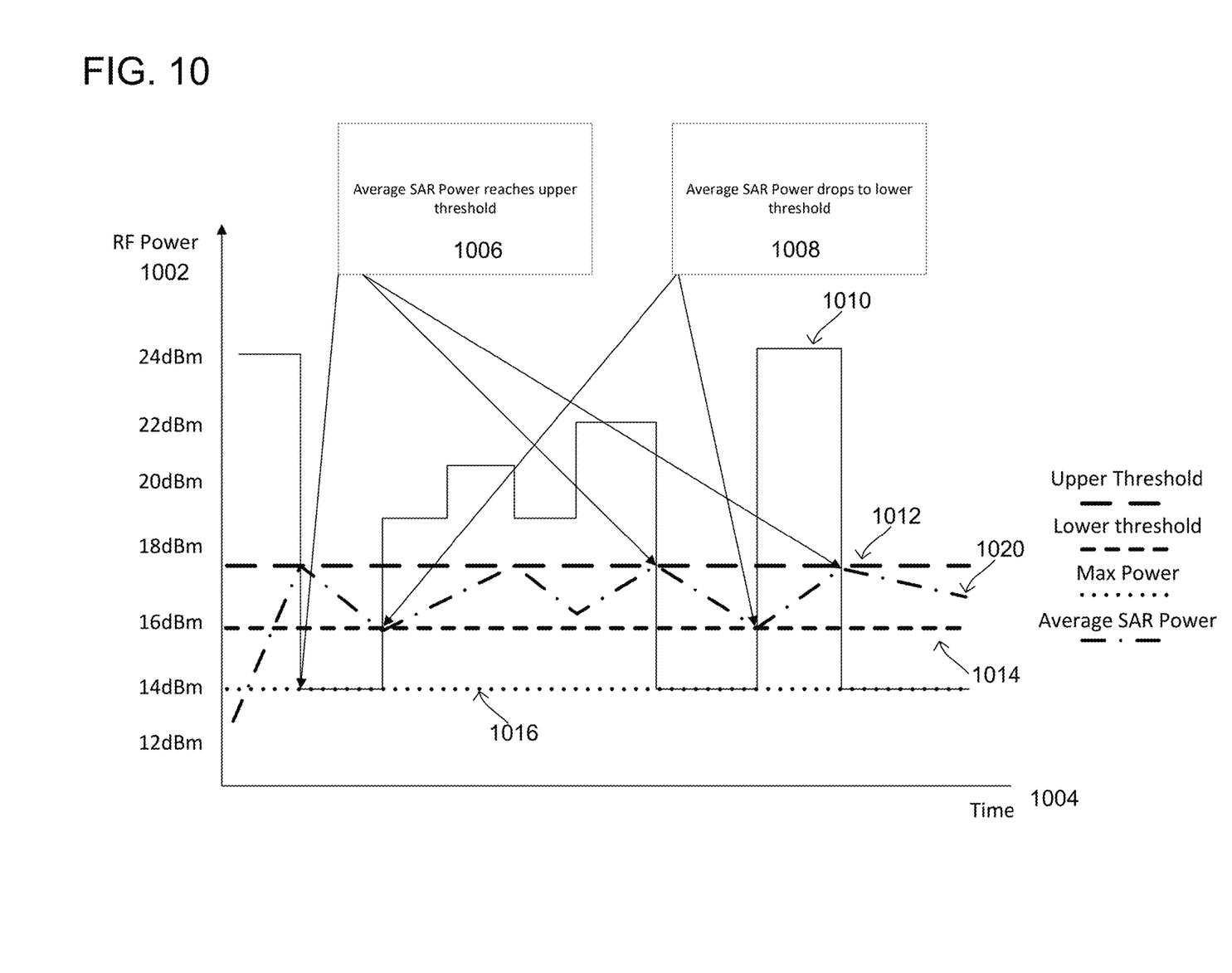
FIG. 10 illustrates a control and trigger logic for switching between antennas in a wireless communication device.

FIG. 10 shows an exemplary RF power 1002 as a function of time 1004 for a TA-SAR technique. Line 1010 shows RF power back-offs according to a TA-SAR technique. FIG. 10 illustrates three times 1006 when the average SAR reaches an upper threshold 1012 and two times 1008 when the average SAR power drops to a lower threshold 1014. Line 1002 indicates the average SAR power over time. As shown in FIG. 10 the average SAR power 1020 mostly fluctuates between upper threshold 1012 of 16 dBm and lower threshold 1014 of 17 dBm. As shown in FIG. 10, there can be large drops during a power back-off. For example, a drop to max power 1016 of 14 dBm at times 1006. Points n FIG. 7 shows that threshold levels depend on the duty cycle of the transmission. When the Antenna hopping is combined with TA-SAR, these large drops can be mitigated. By switching antennas at times 1006, the drop will not have to be as severe as shown in FIG. 10. The thresholds can be further enhanced as the effective transmit power of an individual antenna gets reduced.

Basic SAR measurements for all antennas need to be performed on a system level to come up with a transmit power threshold value for different bands and for each antenna, at which the SAR limit exceeds. Antenna hopping durations are decided based on duration taken to exceed the SAR limits for each antenna.

Figure 11:
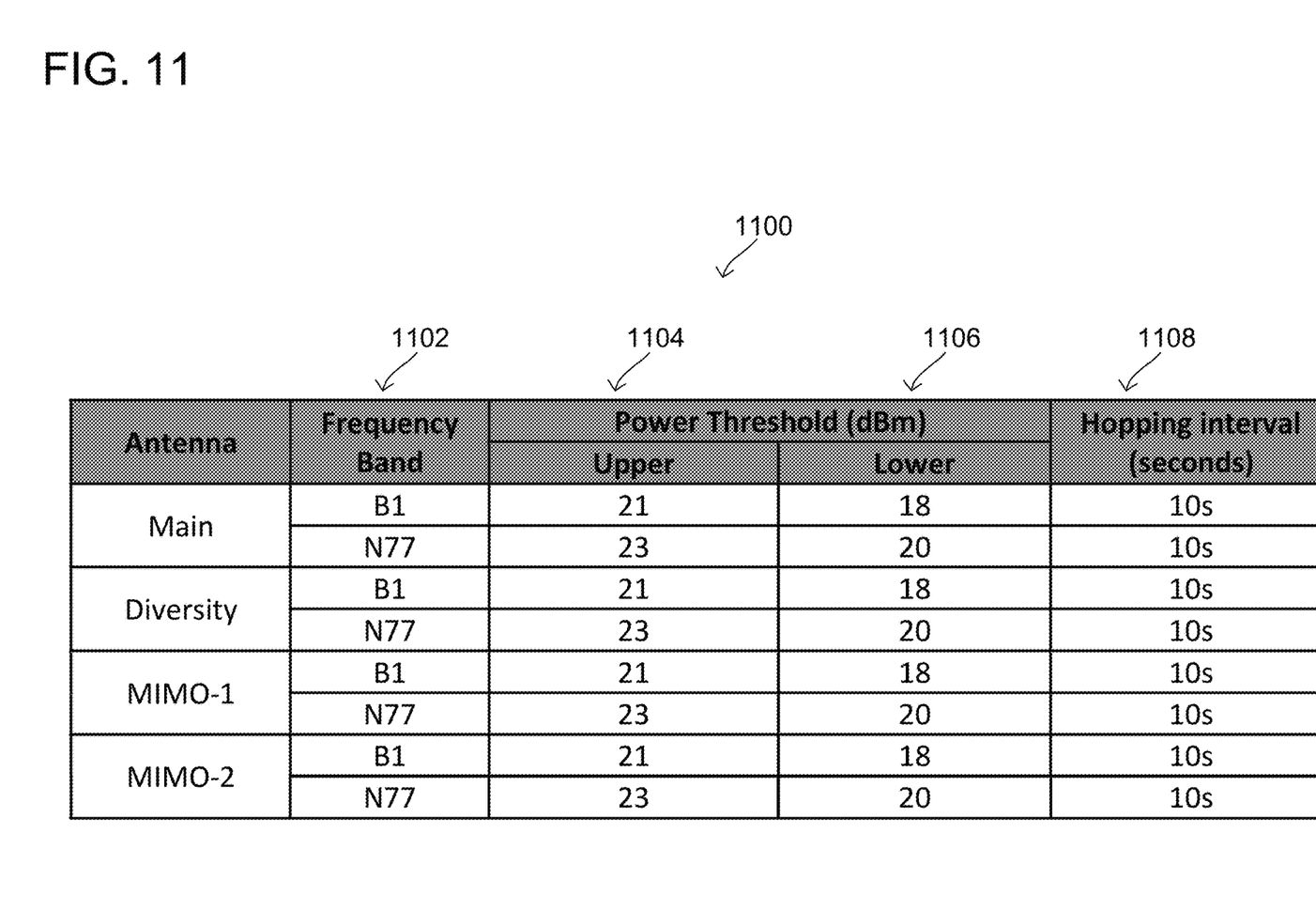
FIG. 11 illustrates an exemplary LookUp Table (LUT).

FIG. 11 shows an exemplary Lookup Table (LUT) 1100 for antenna switching. The LUT will be generated to define the transmit power threshold values and antenna hopping time intervals for different frequency bands 1102 based on a one-time characterization performed during the design phase. The antennas hopping will start when the transmit power crosses the threshold values. The threshold values 1104 and 1106 and antennas hopping time intervals 1108 may vary for different bands based on the system design.

Upper threshold 1104 are the trigger to start an antenna switch, or antennas hopping. When the TX power rises above this threshold, antenna hopping starts. Lower threshold 1106 triggers an end to an antenna switch. When the TX power drops below this limit, the antenna hopping stops. There is a 3 dB separation provided between upper threshold 1104 and lower threshold 1106 to avoid continuous toggling between the antennas.

Duration 1108 is given only as an example and not the actual values from measurement. The exact duration may be decided during the design phase and will determine how long a transmit chain is used before switching to another antenna.

Figure 12:
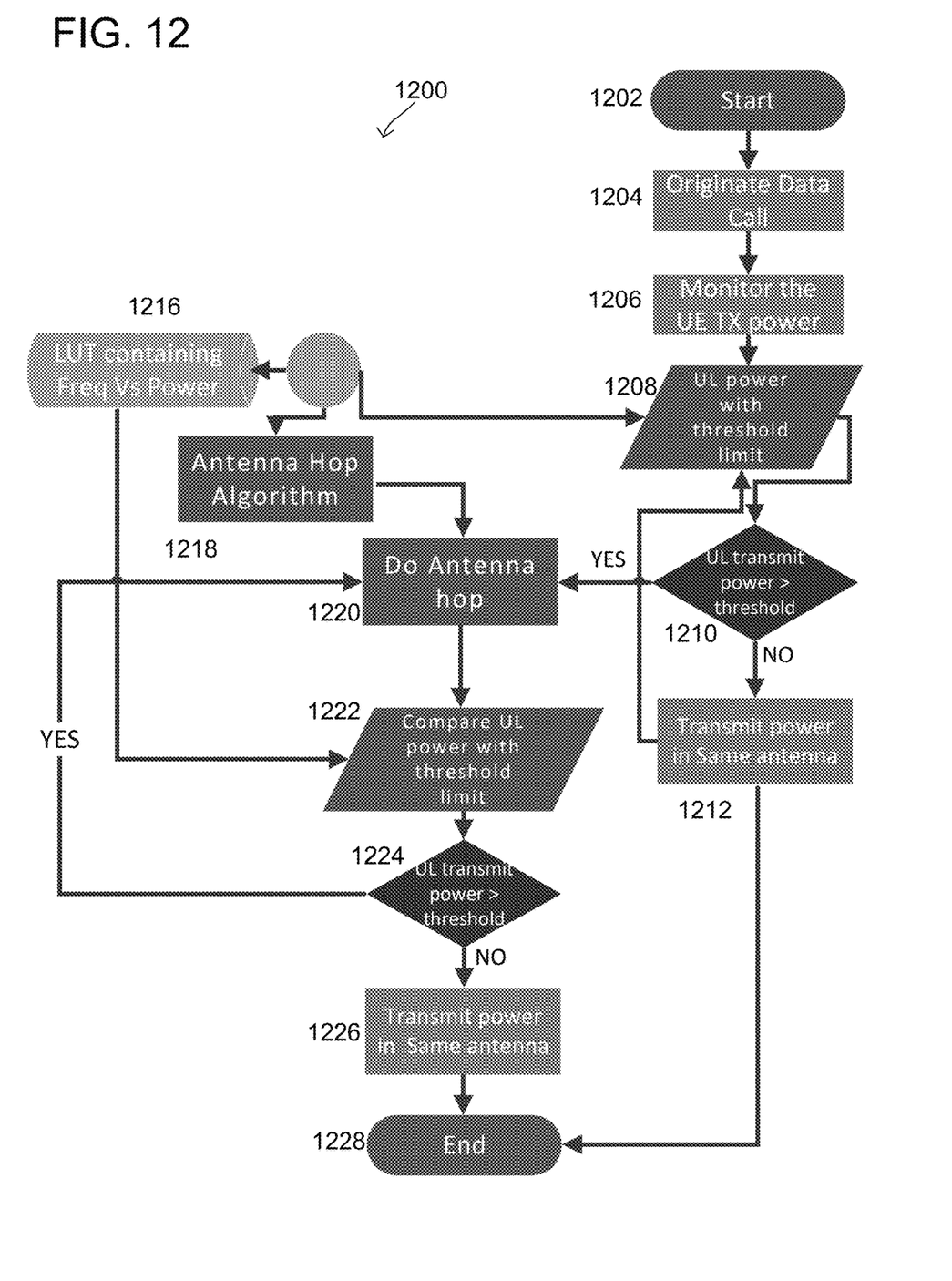
FIG. 12 illustrates an exemplary flow chart of a method for switching antennas.

FIG. 12 illustrates a method 1200 for antenna switching. Method 1200 may include steps to determine when to switch antenna. Method 1200 beings at step 1202. Originating data transmission at step 1204 may trigger monitoring UE TX power at step 1206. An uplink power threshold limit may be received at step 1208. The uplink power threshold is compared with the monitored TX power from step 1206 at step 1210. If the TX power is less than the power threshold, then TX continues at the current antenna at step 1212 and the method 1200 routine ends at step 1228. If the TX power is greater than the power threshold, then antenna hop, or antenna switch, subroutine starts at step 1220. Antenna hop algorithm at step 1218 may lookup a LUT at step 1216. The power threshold received from step 1210 is compared to the appropriate value from the LUT received at step 1216. At step 1224, if the TX power is less than the power threshold, then TX continues at the current antenna at step 1226 and the method 1200 routine ends at step 1228. If the TX power is greater than the power threshold, then the antenna hop routine returns to step 1220 to switch antenna.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A mobile communication device comprising:
    an antenna;
    a plurality of further antennas;
    a processor configured to:
        determine that the antenna is transmitting a signal at a transmission frequency;
        retrieve a transmission time threshold, based on the transmission frequency, from a lookup table;
        determine a duration of transmitting the signal; and
        switch transmitting the signal from the antenna to a further antenna of the plurality of further antennas, if the duration reaches the transmission time threshold, wherein the lookup table relates the transmission time threshold, the transmission frequency, and the duration of transmitting the signal.

2. The mobile communication device of claim 1, wherein the transmission time threshold is further based upon a transmission power.

3. The mobile communication device of claim 1, further configured to determine the further antennas based on a switching algorithm.

4. The mobile communication device of claim 1, further configured to determine the further antenna based on a distance between the antenna and the further antenna.

5. The mobile communication device of claim 1, further configured to determine the further antenna based on a random selection from the plurality of further antennas.

6. The mobile communication device of claim 1, wherein the device comprises no proximity sensors.

7. A method comprising:
    determining that an antenna is transmitting a signal at a transmission frequency;
    retrieving a transmission time threshold, based on the transmission frequency, from a lookup table;
    determining a duration of transmitting the signal; and
    switching transmitting the signal from the antenna to a further antenna of a plurality of further antennas, if the duration reaches the transmission time threshold, wherein the lookup table relates the transmission time threshold, the transmission frequency, and the duration of transmitting the signal.

8. The method of claim 7, wherein the transmission time threshold is based upon an uplink transmission power.

9. The method of claim 8, further comprising determining the further antenna based on a switching algorithm.

10. The method of claim 8, further comprising determining the further antenna based on a distance between the antenna and the further antenna.

11. The method of claim 8, further comprising determining the further antenna based on a random selection from the plurality of further antennae.

* * * * *